No. 636,007. Patented Oct. 31, 1899.
O. SEHRWALD.
BALL TOOTHED DRIVING GEAR.
(Application filed Dec. 7, 1898.)
(No Model.)
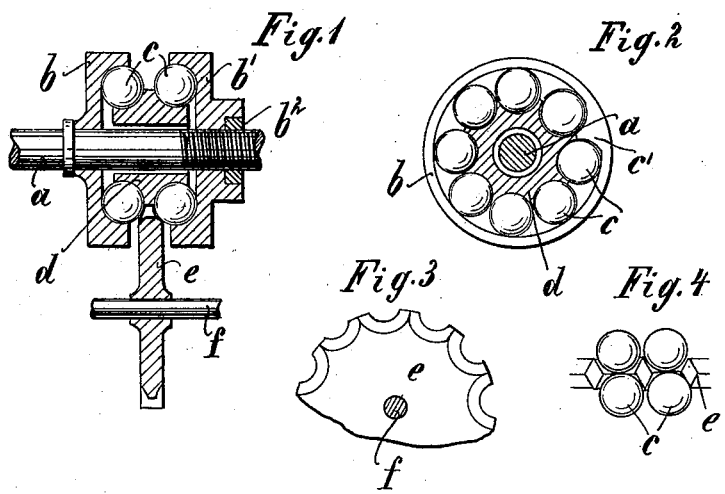
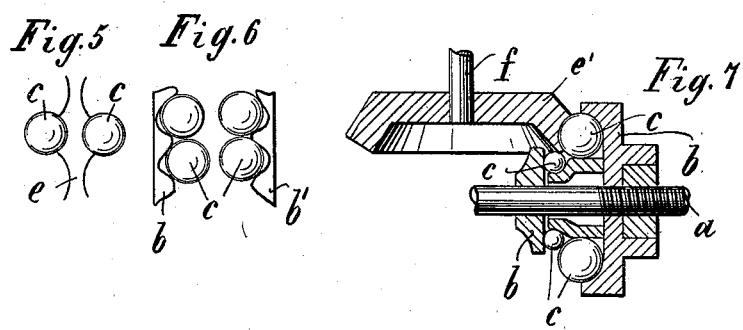
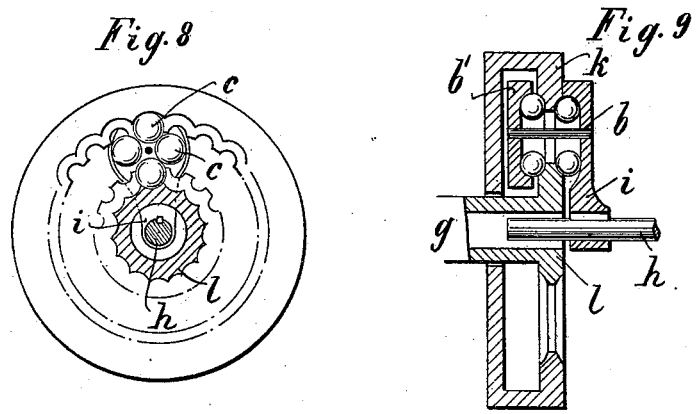
Witnesses
Inventor

UNITED STATES PATENT OFFICE.

OTTO SEHRWALD, OF HAMBURG, GERMANY.

BALL-TOOTHED DRIVING-GEAR.

SPECIFICATION forming part of Letters Patent No. 636,007, dated October 31, 1899.

Application filed December 7, 1898. Serial No. 698,537. (No model.)

*To all whom it may concern:*

Be it known that I, OTTO SEHRWALD, merchant, a subject of the King of Prussia, German Emperor, residing at 28 Marienstrasse, Hamburg, St. Paula, Germany, have invented new and useful Improvements in Ball-Toothed Driving-Gear, of which the following is a specification.

This invention relates to that class of gearing wherein loose rollers or balls take the place of teeth in transmitting motion with the object of reducing friction to the minimum.

With this end in view the invention consists in certain novel features of construction and combination of parts hereinafter described and the essential elements of which are recited in the appended claim.

The accompanying drawings show several examples of the manner of carrying this invention into practice and of utilizing the same.

Figures 1 to 4 illustrate the use of spherical teeth for front wheels.

Upon the shaft $a$ are arranged the sockets $b\ b'$, which receive the balls $c$. One of these sockets $b'$ is rendered adjustable and is secured in position by means of a counter-nut $b^2$. At one point the balls bear against a tooth $c'$ of the socket, so that the former may not be able to roll therein. The balls are arranged in two rows and are supported by a toothed ring $d$, having the form of a double cone and loosely surrounding the shaft $a$. Between each four balls gear, as shown in Figs. 3 and 4, the teeth of the gear-wheel $e$, fixed to the second shaft $f$. As soon as the latter turns the balls are carried away with the sockets $b\ b'$, mounted on the driven shaft $a$. The balls turn and roll in such a manner that very little friction is developed against the sides of the teeth.

Instead of two rows of balls one row may be deemed sufficient, the teeth of the gear-wheel surrounding them like a fork.

When the rows of balls have no need of being tightly arranged one upon the other, the teeth of the wheel $e$ may, as shown in Fig. 5, be arranged on both sides of a plate. The sockets $b\ b'$ for the balls may be likewise provided with teeth, as shown in Fig. 6.

In Fig. 7 is shown the application of the invention to bevel-wheels. In this case two balls $c\ c$ of different sizes are used, so that a bevel-wheel can be treated in exactly the same manner as in Fig. 1. The toothed wheel $e'$ must obviously have likewise a conical shape.

Figs. 8 and 9 show an arrangement of teeth for planet-wheels, a crank-arm $i$ being fixed on one of the shafts $h$, in order to carry the sockets $b\ b'$. The latter are furnished with teeth $c'$, so that the conical ring may be free to turn around. In this ring engages outside a fixed wheel $k$ and inside the toothed wheel $l$, mounted on the second spindle $g$. When, for instance, the spindle $h$ is rotated, the wheel formed of the balls $c$ turns within $k$ and transmits motion to the shaft $g$. Obviously $l$ could be fixed and $k$ be connected with the second spindle. Such toothed wheels may be used for all mechanical purposes, but are more particularly intended for velocipedes.

Having now described my invention, what I claim as new, and desire to secure by Letters Patent, is—

Ball-toothed driving-gear, comprising in combination two adjustable ball-retaining disks mounted on a common axle, a loosely-mounted ring inclosed by said disks, said disks and ring having rows of sockets for balls, balls seated in said sockets and prevented from rolling by projecting teeth, and another wheel having its perimeter fitted to mesh with said balls, substantially as described.

In testimony whereof I have hereunto set my hand in presence of two subscribing witnesses.

OTTO SEHRWALD.

Witnesses:
EMIL WÜRFEL,
E. H. L. MUMMENHOFF.